United States Patent

[11] 3,622,711

[72] Inventor William H. Blashfield
Galion, Ohio
[21] Appl. No. 852,676
[22] Filed Aug. 25, 1969
[45] Patented Nov. 23, 1971
[73] Assignee North Electric Company
Galion, Ohio

[54] TONE DETECTOR
13 Claims, 12 Drawing Figs.

[52] U.S. Cl. .......... 179/84 VF
[51] Int. Cl. .......... H04m 1/50, H04q 9/12
[50] Field of Search .......... 179/84 VF

[56] References Cited
UNITED STATES PATENTS
3,428,757 2/1969 Roscoe .......... 179/84 VF

*Primary Examiner*—Kathleen H. Claffy
*Assistant Examiner*—William A. Helvestine
*Attorney*—Johnson, Dienner, Emrich, Verbeck & Wagner

ABSTRACT: An electronic tone detector circuit for each line in a portable multiline military telephone set which communicates with a switchboard, said tone detector circuit being arranged to detect priority and nonpriority ringing tones and busy tone without responding to speech or random noise. The tone detector circuit includes an incoming limiting amplifier stage which feeds a discriminator stage. The output of the discriminator stage is conducted via a polarity gate stage to three parallel circuits, which provide logic signals over three paths (priority, nonpriority, and busy) to succeeding circuitry in said multiline set to enable said circuitry to effect corresponding visual and audible signals and control of telephonic connections as required.

SIGNAL RESPONSIVE CIRCUIT SR

INVENTOR
WILLIAM H. BLASHFIELD

BY Brown, Jackson, Boettcher & Dienner

ATTORNEY

INVENTOR
WILLIAM H. BLASHFIELD

BY Brown Jackson Boettcher & Dienner
ATTORNEY

INVENTOR
WILLIAM H. BLASHFIELD

BY

ATTORNEY

INVENTOR
WILLIAM H. BLASHFIELD

BY

ATTORNEY

TONE DETECTOR

BACKGROUND OF THE INVENTION

The invention herein described was made in the course of or under a contract or subcontract therein with the Department of the U.S. Air Force. 1. Field of Invention The field of invention is found in class 179–84 and class 349–401.

2. Description of the Prior Art

Certain types of communication systems presently in use in the field include subscriber sets which have the capability of receiving normal calls (referred to as nonpriority calls hereafter) as well as calls having a preferred status (referred to as priority calls hereafter). Subscriber sets of such type have equipment which is operable to detect the presence of incoming priority calls and nonpriority calls, and to control an associated circuitry to provide corresponding audible and visual signals.

In one known system having such capabilities, priority signals are identified by reversing the phase of the priority signals outgoing from a switchboard at regular intervals while the phase of the nonpriority signals was left undisturbed. The subscriber subsets in such system were provided with circuitry which used as phase modulation detection techniques to detect the different signals. Unfortunately in such system it is also necessary to provide a reference lead from the switchboard to the subscriber set. While the provision of this additional conductor is feasible in some type of installations, it is apparent that in other installations, as for example, in systems in which radio transmissions are required from the switchboard, the additional reference lead is not readily provided. Moreover, even in systems in which such additional equipment could be provided, the presence of the extra lead was not particularly desirable.

SUMMARY OF THE INVENTION

In a more recently developed system the use of the extra lead is eliminated by using frequency shift techniques in signalling from the switchboard to the subset. For priority signals, 600 and 425 Hz. signals are shifted at a 10 Hz. rate and the envelope is on for one second and off for one second. For nonpriority calls, the 600 Hz. signal is interrupted at a 10 Hz. rate and the envelope is on for 2 seconds and off for 4 seconds. Busy tone signal is provided by a 425 Hz. signal interrupted at a 2 Hz. rate.

The present invention discloses novel apparatus for, and method of, detecting and providing signals for incoming priority nonpriority, and busy tone signals in such type system. A tone detector circuit includes an incoming limiting amplifier which converts the incoming sine wave signals to square wave signals of limited amplitude and feeds these signals to a discriminator stage. The output of the discriminator stage passes through an amplifier stage, the output of which is conducted via a polarity gate stage to the inputs of a three section signal indicator circuit. This polarity gate stage routes signals of one polarity over a 10 Hz. filter in the first section of the indicator circuit to a threshold detector which provides a changed output whenever the received signal includes a 600 Hz. signal (priority and nonpriority signal input). The polarity gate stage routes signals of the other polarity to the second and third sections. The second section includes level detector means which provides a changed output whenever the 425 Hz. signal is present; the third section includes a 2 Hz. filter which enables a changed output from the third section only when busy tone is input to the subset. The changing outputs of the first, second, and third sections control a logic signal gating stage including NAND gates and inverters which provide logic signals over three discrete paths as priority, nonpriority, and busy marking to succeeding circuitry which provides appropriate audible and visual signals and control of telephonic connections.

DESCRIPTION OF PREFERRED EMBODIMENTS

Figure 1:
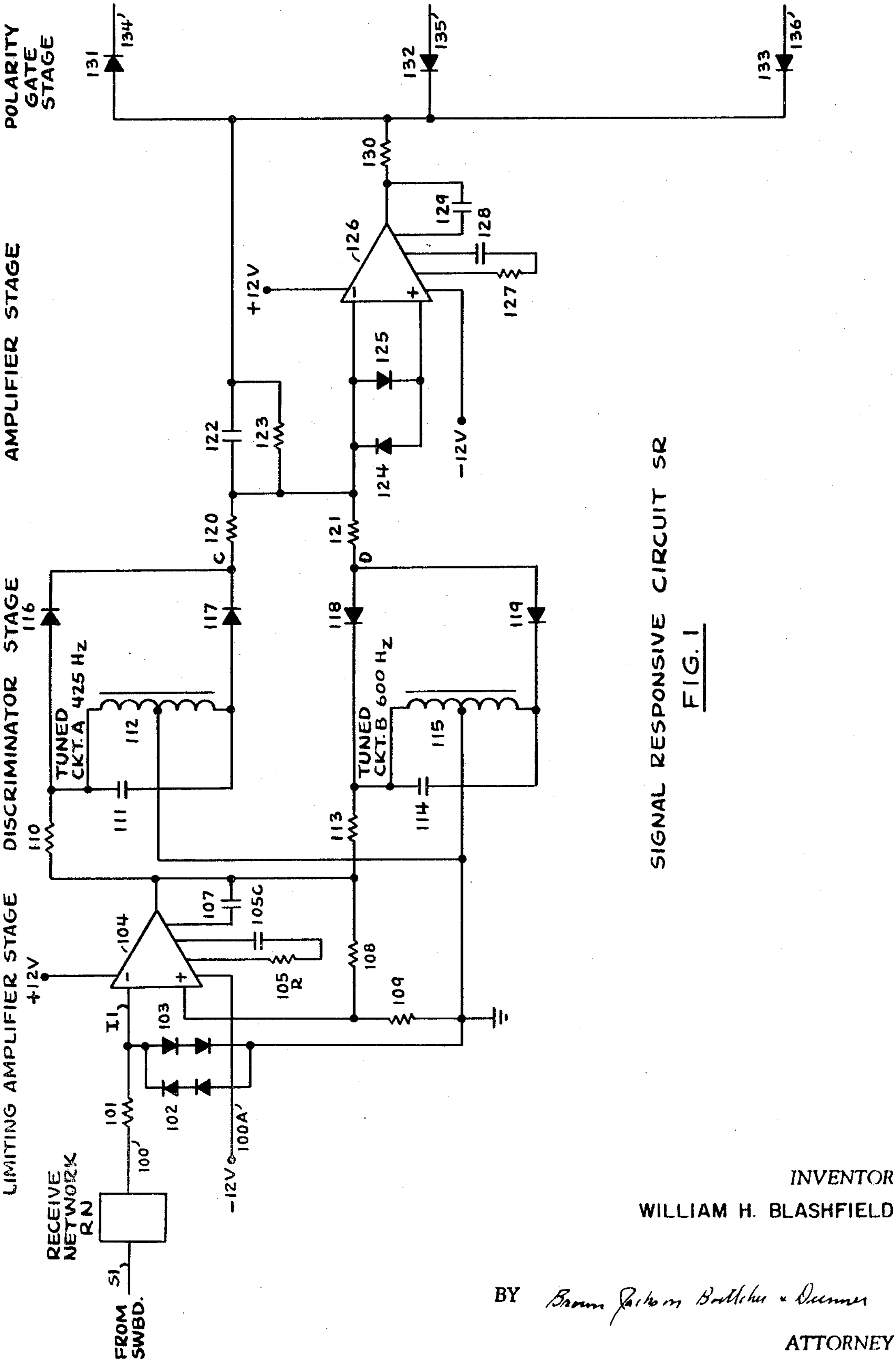
FIGS. 1 and 2 placed side by side as illustrated in FIG. 3D disclose the schematic circuit diagram of the electronic tone detector.
Figure 2:
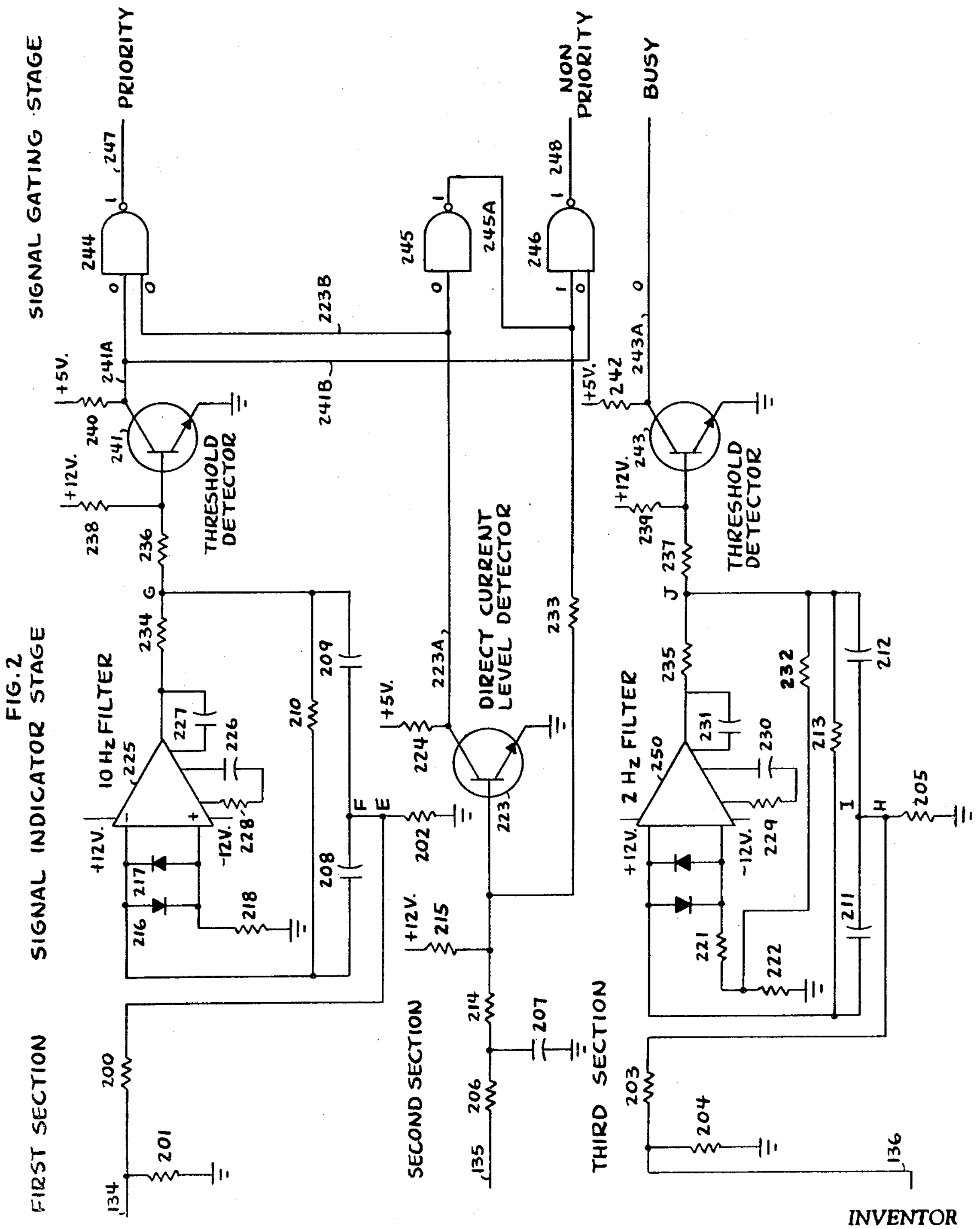
Figure 3A:
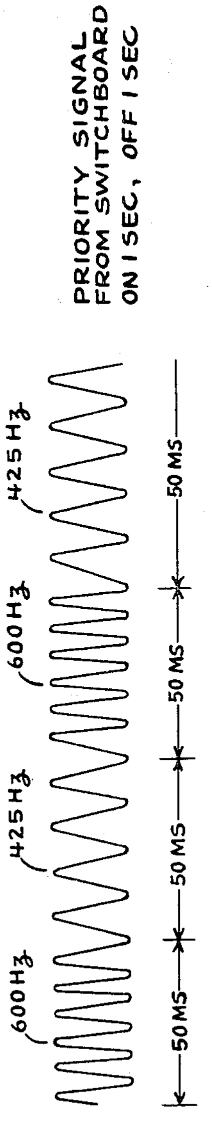
FIGS. 3A–3C disclose representative wave shapes of the various signals input to the detector from the switchboard.
Figure 3B:
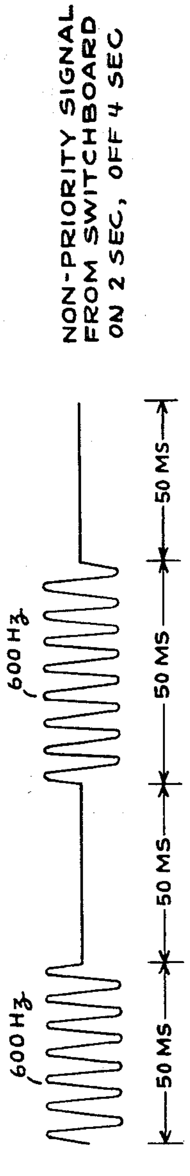
Figure 3C:
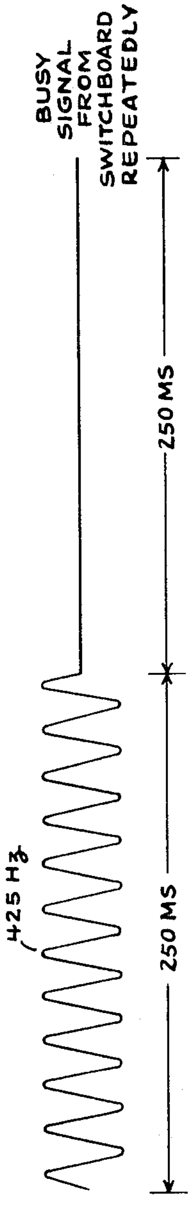
Figure 3D:
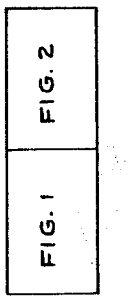

With reference to FIGS. 1 and 2, the novel tone detector circuit is shown connected to the receiver network RN of a line in a portable multiline military telephone set which communicates with a switchboard, there being a network such as RN and a tone detector circuit for each line. The logic outputs of the tone detector circuits are connected to common logic control circuitry which provide appropriate audible and visual signals. Incoming signals from an associated switchboard (not shown) are fed over an input conductor S1, the receiver network RN, conductor 100, and resistor 101 to the inverting input of operational amplifier 104. Three different types of signals having the waveforms shown in FIGS. 3A, 3B, and 3C are transmitted from the switchboard over such input to amplifier 104.

Each input signal on conductor 100 is fed to amplifier 104. Amplifier 104 (also amplifiers 126, 225 and 250) may be a well known integrated circuit operational amplifier of the $\mu$A709 type. Amplifier 104 is connected in circuit as a limiting amplifier which in operation performs the function of limiting and converting the sine wave signals incoming on conductor 100 to a square wave which has a constant amplitude. Capacitor 105C and resistor 105R, along with capacitor 107, provide the necessary frequency compensation and amplifier stabilization for amplifier 104. The noninverting input of amplifier 104 is connected via resistor 109 to ground and +12 volts and −12 volt bias potential are connected as power to the amplifier 104. Diodes 102 and 103 are connected in circuit across the inverting and noninverting inputs of amplifier 104 to minimize the possibility of damage to the amplifier components by voltage spikes. Similar networks and diodes and power connections are associated with amplifiers 126, 225, and 250. The limiting characteristic of amplifier 104 acts as an initial guard against voice and noise signals.

The square wave signal current output from amplifier 104 is applied over resistors 110 and 113 to the discriminator stage which includes the tuned circuit A and associated diodes 116 and 117 and the tuned circuit B and associated diodes 118 and 119. The first tuned circuit A, consisting of parallel connected capacitor 111 and inductor 112, is tuned at 425 Hz. and the second tuned circuit, consisting of parallel connected capacitor 114 and inductor 115, is tuned at 600 Hz. The discriminator stage provides a further guard against voice and noise signals.

If the incoming signal is a priority signal (FIG. 3A), both 600 and 425 Hz. alternately will be present for 50 ms. intervals each and a voltage will appear alternately at points C and D. If the incoming signal is a nonpriority signal only interrupted 600 Hz. will be present and a corresponding voltage will appear at point D during alternate intervals of 50 ms. (FIG. 3B). If a busy signal is received, a 425 Hz. interrupted at a 2 Hz. rate will be present and a corresponding voltage during alternate quarter second intervals will be present at point C.

a. Priority Signals

Figures 4, 4A, 4B, 4C, 4D, 4E:
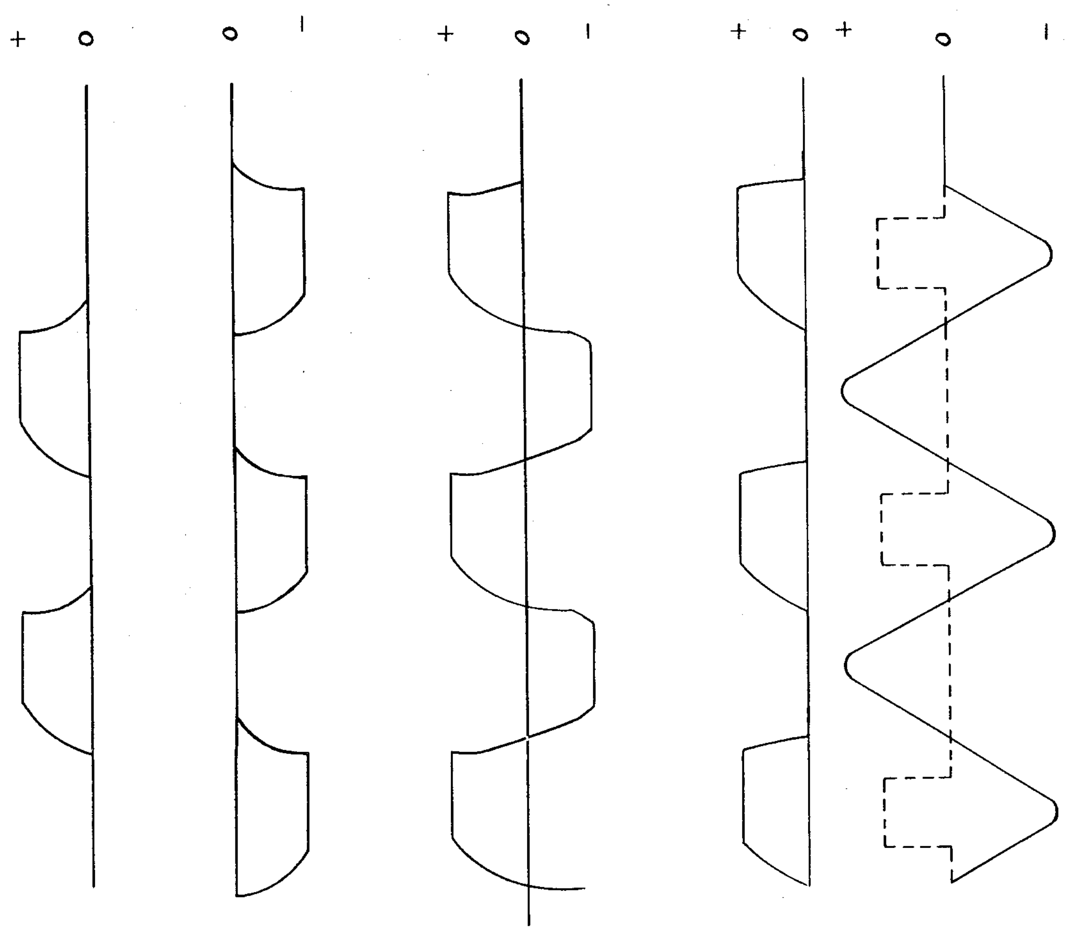
FIGS. 4 and 4A–4E illustrate representative waveforms which may occur at various stages in the circuit.

During receipt of the priority signal, the resultant signal output of the tuned circuit A is rectified by diodes 116 and 117 and appears at point C, and the resultant signal output of tuned circuit B is rectified by diodes 118 and 119 and appears at point D. The average values of the rectified signal outputs at points C and D are shown in FIGS. 4A and 4B respectively.

The positive going voltage (FIG. 4A) output from the tuned circuit A (corresponding to 425 Hz.) and diodes 116 and 117 at point C is applied over resistor 120 to the inverting input of amplifier 126, and the negative-going output voltage of the tuned circuit B (600 Hz.) and diodes 118 and 119 at point D is applied over resistor 121 to the same input of amplifier 126.

The waveform output (See FIG. 4C) of the amplifier 126 (inverted relative to the input waveforms of FIGS. 4A, 4B) is fed via resistor 130 to diode gates 131, 132, 133 of the polarity gate stage. Such waveform in the case of a priority signal input varies between +10 volts to −10 volts at a rate of 10 Hz. (corresponding to alternate 600 Hz. and 425 Hz. signals), the +10 volt portion corresponding to the 600 Hz. input and the −10 volt portion to the 425 Hz. input. The nature of the waveform output for the nonpriority and busy signals will be evident therefrom.

A feedback loop including capacitor 122 is connected to the input of amplifier 126 to provide low pass filtering.

b. Nonpriority Signal

In the case of an incoming nonpriority call, the ringing signal input to the set over conductor $S_1$ contains only a 600 Hz. signal, and therefore only tuned circuit B and diodes 118 and 119 will provide a voltage signal (negative going) at the input of the discriminator 126. In the case of a nonpriority signal (600 Hz. only) the output of amplifier 126 comprises a waveform which varies between 0 volts and approximately +10 volts at a 10 Hz. rate during alternate 50 ms. intervals (The waveform of FIG. 4D which is that of FIG. 4B inverted).

c. Busy Tone Signal

In the event a busy tone signal is received over the input circuit $S_1$ only 425 Hz. is present, and only tuned circuit A and diodes 116 and 117 will provide a signal voltage (positive going) to the input of discriminator amplifier 126, which in turn provides a negative signal voltage output to the signal indicator circuit. In the case of busy tone (425 Hz. only), the output of the discriminator amplifier 126 varies between 0 volts and approximately −10 volts at the 2 Hz. rate.

SIGNAL INDICATOR CIRCUIT

The signal indicator circuit comprises three sections which are selectively operative in response to the receipt of signals over the polarity gate stage in a manner to be described.

Normally, with no signals input over lead 134 to the first section, NPN-transistor 241 therein will be found conducting with +12 volts through resistor 240 connected to the base, +5 volts through resistor 240 connected to the collector, and ground connected to the emitter thereof; and lead 241A will be at essentially ground potential, comprising logic 0.

Normally, with no signals input over lead 135 to the second section, NPN-transistor 223 will be found conducting with +12 volts through resistor 215 connected to the base, +5 volts through resistor 224 connected to the collector, and ground connected to the emitter thereof; and lead 223A will be at essentially ground potential, comprising logic 0.

Normally, with no signals input over lead 136 to the third section, NPN-transistor 243 will be found conducting with +12 volts through resistor 239 connected to the base, +5 volts through resistor 242 connected to the collector, and ground connected to the emitter thereof; and lead 243A will be at essentially ground potential, comprising logic 0.

OPERATION OF FIRST SECTION

Assume that the 10 Hz. signal of FIG. 4D varying between 0 volts and +10 volts is input over lead 134 to the first section of the signal indicator circuit (as a result of either priority or nonpriority signals). This signal passes over high resistance 200, point E and low resistance 202 of a voltage divider to ground. Point E is connected to point F of a 10 Hz. filter as shown, consisting of operational amplifier 225 and its associated circuitry, output resistance 234, and a bridged T-circuit comprising resistance 210 and capacitances 208 and 209 connected between the output and the inverting input, providing negative feedback. Relatively low resistance 201 insures adequate current flow through diode 131.

The Q of the 10 Hz. filter is critically adjusted to introduce a certain delay which guards against noise and speech signals from appearing at the output of this filter.

The output of amplifier 225 through resistance 234 at point G (i.e. the output of the 10 Hz. filter which is a 20-volt peak to peak sine wave between +10 volts and −10 volts) is connected over resistance 236 to the base of transistor 241 which acts as a threshold detector. As the signal to the base of transistor 241 as a result thereof decreases below negative 7 volts, the base is reverse biased and transistor 241 turns off and remains off during the interval that this incoming signal to the base is more negative than −7 volts. During this period, +5 volts (logic 1) obtains on lead 241A.

With reference to FIG. 4E, the sinusoidal waveform at point G, which is applied to the base of transistor 241 through resistance 236, is shown as solid line for comparison with the square voltage waveform which occurs on lead 241A, represented as a dotted line. As noise or speech signals will not cause the signal at the base of transistor 241 to go more negative than −7 volts, transistor 241 will not change state due to noise or speech signals. (Actually, the limiting amplifier 104 and the discriminator stage have provided initial guard circuits against noise or speech signals but the 10 Hz. filter and threshold detector of the first section and 2 Hz. filter and threshold detector of the third section act as further guards.)

OPERATION OF THE SECOND SECTION

Assume that a signal varying between 0 volts and −10 volts is input over lead 135 to the second section of the signal indicator circuit (i.e. a 10 Hz. signal as a result of the 425 Hz. component of the priority signal; or the 425 Hz. busy signal, the operation as a result of the busy signal being incidental.)

As the signal varying between 0 volts and −10 volts is received over conductor 135, capacitor 207 quickly charges to negative potential and remains at negative potential during the one second on of the priority signal or during all of the busy signal.

As capacitor 207 charges to negative potential, this negative potential via resistor 214 to the base of transistor 223 turns transistor 223 off, whereby the collector thereof and lead 223A is placed at approximately −5 volts potential constituting logic 1.

During the 1 second off of the priority signal or when busy tone ceases, capacitor 207 discharges over resistors 214 and 215 and becomes positively charged whereby transistor 223 is again operated.

OPERATION OF THE THIRD SECTION

Assume that a signal varying between 0 volts and −10 volts is input over lead 136 to the third section of the signal indicator circuit (i.e. a 10 Hz. signal as a result of the 425 Hz. component of the priority signal which is incidental; or the 2 Hz. busy signal). This signal passes over high resistance 203, point H and low resistance 205 of a voltage divider to ground. Point H is connected to point I of a 2 Hz. filter as shown, consisting of operational amplifier 250 and its associated circuitry, output resistance 235, and a bridged T-circuit comprising resistance 213 and capacitances 211 and 212 connected between the output and the inverting input, providing negative feedback. Resistor 232 connected between the output at point J to the common point of resistors 221 and 222 provides positive feedback, allowing capacitors 211 and 212 to be of smaller value for convenience and economy. Relative low resistance 204 insures adequate current flow through diode 133.

The Q of the 2 Hz. filter is critically adjusted to introduce a certain delay which prevents noise and speech signals from appearing at the output of the filter. Also the 2 Hz. filter blocks the incidental 10 Hz. signal.

The operation of transistor 243 by the 2 Hz. filter is similar to the operation of transistor 241 by the 10 Hz. filter already described.

SIGNAL GATING CIRCUIT

Referring now to the signal gating circuit of FIG. 2, with transistors 241, 223, and 243 normally conducting, essentially ground potential (logic 0) obtains on leads 241A (and 241B), 223A (and 223B), and 243A.

Referring to NAND-gate 244, logic 0 on lead 241A and logic 0 on lead 223B will be input thereto whereby the output on lead 247 will be logic 1 to succeeding logic control circuitry (not shown) as a signal thereto that no priority signal should issue.

Referring to inverter 245, logic 0 input thereto on lead 223A results in logic 1 (positive potential) output therefrom. This positive potential through resistance 233 effects a snap action of transistor 223 upon turn on. This logic 1 obtains as an input to NAND-gate 246.

Referring to NAND-gate 246, 1 1 on lead 245A and logic 1 on lead 241B will be input thereto whereby the output on lead 248 will be logic 1 to said succeeding logic control circuitry (not shown) as a signal thereto that no nonpriority signal should issue.

Referring to transistor 243, logic 0 output therefrom on lead 243A to succeeding logic control circuitry (not shown) is a signal thereto that no busy control of telephonic connections is called for.

In preparation for what follows it should be observed that if transistor 223 is on, logic 1 is input to NAND-gate 246 preparing for operation thereof as a nonpriority signal is received; whereas if transistor 223 is off, logic 1 is input to NAND-gate 244 preparing for operation thereof as a priority signal is received.

Priority Signal

Assume that a priority signal (600 Hz. and 425 Hz. shifted at the 10 Hz. rate) is received. The 425 Hz. component results in the turning off of transistor 223, which in turn results in logic 1 to NAND-gate 244 preparing this gate, and logic 0 (essentially ground) on lead 245A to NAND-gate 246 keeping this gate inhibited. Ground placed on lead 245A through resistor 233 effects a snap action of transistor 223 on turnoff. As each 600 Hz. component is received, transistor 241 is turned off, resulting in logic 1 on lead 241A to NAND-gate 244 and logic 1 on lead 241B to NAND-gate 246. With both inputs of NAND gate at logic 1, the output on lead 247 becomes logic 0 as a signal to said succeeding logic control circuitry (not shown) to issue distinctive audible and/or visual signals indicative of an incoming priority call. With one input of gate 246 at logic 0 and another at logic 1, no change in the output of NAND-gate 246 results.

The diode 133 prevents signals related to the 600 Hz. component of the 10 Hz. priority signal from entering the third section and the 2 Hz. filter of the third section prevents the signals related to the 425 Hz. component of the 10 Hz. priority signal from affecting transistor 243.

Nonpriority Signal

Assume that a nonpriority signal (600 Hz. turned on and off at 10 Hz. rate) is received. With no 425 Hz. component present, transistor 223 remains conducting whereby logic 0 on conductor 223B to NAND-gate 244 keeps this gate inhibited, and logic 1 on lead 245A to NAND-gate 246 prepares this gate. As each burst of the 600 Hz. component is received, transistor 241 is turned off, resulting in logic 1 on lead 241A to NAND-gate 244 which does not respond, and logic 1 on lead 241B to NAND-gate 246 which does respond, with both inputs of NAND-gate 246 at logic 1. The output of NAND-gate 246 on lead 248 becomes logic 0 as a signal to said succeeding logic control circuitry (not shown) to issue distinctive audible and/or visual signals indicative of an incoming nonpriority call.

Diode 133 prevents signals related to the 600 Hz. bursts from entering the third section.

Busy Signal

Assume that the busy signal (425 Hz. turned on and off at the 2 Hz. rate is received. Transistor 243 becomes turned off at the reception of each 425 Hz. burst, placing logic 1 on lead 243A to succeeding logic control circuitry (not shown) enabling the same to control telephonic connections.

Transistor 223 in the second section incidentally follows the 425 Hz. bursts but, as no 600 Hz. bursts are present, NAND-gates 244 and 246 do not respond.

The novel circuit set forth herein is thus operative to detect and signal the occurrence of priority, nonpriority and busy tone signals at a telephone set, guarding against false signaling as a result of receipt of speech or noise.

REPRESENTATIVE LIST OF VALUES

A representative list of values for practicing the invention is as follows.

All diodes—IN914
All transistors—2N2218
All operational amplifiers—$\mu$A709

| | | |
|---|---|---|
| Resistors | 101 | 12K |
| | 105, 127, 228, 229 | 1.5K |
| | 108 | 294K |
| | 109 | 1K |
| | 110 | 5.6K |
| | 113 | 5.6K |
| | 120 | 15K |
| | 121 | 15K |
| | 123 | 47K |
| | 130 | 220 ohms |
| | 200 | 249K |
| | 201 | 10K |
| | 202 | 2.32K |
| | 203 | 732K |
| | 204 | 10K |
| | 205 | 63.4K |
| | 206 | 1K |
| | 210 | 1.0 Meg |
| | 213 | 1.0 Meg |
| | 214 | 18K |
| | 215 | 39K |
| | 218 | 1.0 Meg |
| | 221 | 1.0 Meg |
| | 222 | 2.37K |
| | 224 | 10K |
| | 232 | 32.4K |
| | 233 | 39K |
| | 234 | 220 ohms |
| | 235 | 220 ohms |
| Resistors | 236 | 33K |
| | 237 | 33K |
| | 238 | 47K |
| | 239 | 47K |
| | 240 | 10K |
| | 242 | 10K |
| Capacitors | 106 | 110 pf. |
| | 107 | 10 pf. |
| | 111 | 0.15 mf. |
| | 114 | 0.1 mf. |
| | 122 | 0.1 mf. |
| | 128 | 0.0047 mf. |
| | 129 | 220 pf. |
| | 207 | 5.0 mf. |
| | 208 | 0.33 mf. |
| | 209 | 0.33 mf. |
| | 211 | 0.33 mf. |
| | 212 | 0.33 mf. |
| | 226 | 0.0047 mf. |
| | 227 | 220 pf. |
| | 230 | 0.0047 mf. |
| | 231 | 220 pf. |
| Gates | 244 | |
| | 246 | Motorola |
| Inverters | 245 | MC846P |
| | 249 | (QUAD 2 IN HAND) |

I claim:

1. In an electronic tone detector circuit for an automatic telephone system, signal responsive means including frequency discriminator means connected to selectively provide different signal sets in response to receipt of first and second tone signals alone and in combination, first means for selectively conducting one predetermined signal of the signal sets output from said signal responsive means, a first circuit for providing a first signal output in response to receipt of said one predetermined signal from said first means, second means for selectively conducting a second predetermined signal of the signal sets output from said signal responsive means, a second circuit for providing a signal output in response to receipt of said second predetermined signal from said second means, a first and a second signal gating means, means for connecting the outputs of said first circuit and said second circuit to enable said first signal gating means only in response to generation of a signal output set by said signal responsive means which includes said first and second predetermined signals, and means for connecting the signal output from said second circuit at least to enable only said second gating means in response to generation of a second signal set by said signal responsive means which includes said second predetermined signal, and means for connecting the outputs of said first and second gating means to succeeding circuitry as nonpriority and priority marking means respectively.

2. A tone detector circuit as set forth in claim 1 in which said second tone signal turned on and off repeatedly at a given frequency comprises a nonpriority signal and said first and second tone signals as frequency shifted at the given frequency comprise a priority signal, and in which a signal set provided by said signal responsive means in response to receipt of nonpriority tone signals is a first envelope corresponding to said second tone signal, and in which a further signal set provided by said signal responsive means in response to receipt of priority tone signals comprises a second envelope corresponding to said first and second tone signals, the polarity of the portion of the second envelope corresponding to the first tone signal being different than the polarity of the portion of the second envelope corresponding to the second tone signal.

3. A circuit as set forth in claim 1 in which said first and second means for selectively conducting said first and said second predetermined signals to said first and second circuits comprise first and second polarity gating means connected between the output of said signal responsive means and said first and second circuits respectively, said first polarity gating means being connected to conduct said first predetermined signals which are of one polarity to said first circuit, and said second polarity gating means being connected to conduct said second predetermined signals which are of said second polarity to said second circuit.

4. An electronic tone detector circuit as set forth in claim 2 in which said second tone signals turned on and off at a given frequency represent a busy tone, and in which said signal responsive means provide a third envelope corresponding to said second tone signal in response to receipt of a busy signal.

5. A circuit as set forth in claim 4 in which said first and second means for conducting said signals to said first and second circuits comprise first and second polarity gating means connected between the output of said signal responsive means and said first and second circuits, said first polarity gating means being connected to conduct signals of one polarity to said first circuit, and said second polarity gating means being connected to conduct signals of said second polarity to said second circuit; and which includes a third circuit for generating a further output signal, and third polarity means connected to pass said third envelope from said signal responsive means to enable said third circuit.

6. In an electronic tone detector circuit for an automatic telephone system, signal responsive means connected to provide different signal output sets in response to receipt of first and second tone signals alone and in combination, first polarity means for passing the signals of one set output from said signal responsive means and certain of the signals of a second set, a first circuit including a first threshold detector for providing a signal output in response to receipt of signals from said first polarity means, second polarity means for passing other signals of the second signal set output from said signal responsive means, a second circuit including a direct current level detector means for providing a signal output in response to receipt of signals from said second polarity means, a first and a second signal gate, enabling means for connecting the outputs of said threshold detector in said first circuit and said level detector in said second circuit to enable said first and second signal gates whereby said first signal gate is enabled only in response to generation of said one signal set by said signal responsive means, and said second gate means is enabled only in response to generation of said second signal set by said signal responsive means, and means for connecting the outputs of said first and second gating means to succeeding circuitry as nonpriority and priority marking means respectively.

7. In an electronic tone detector circuit for an automatic telephone system, input means over which a first set of tone signals is received for one class of call and a second different set of tone signals is received for a second class of calls, signal responsive means including frequency discriminator means connected to provide signal outputs of a first polarity in response to receipt of a first frequency tone in said first and second signal sets and a signal output of a second polarity in response to receipt of a second frequency tone in said first and second signal sets, a first circuit operative to provide one signal output as enabled by a signal on only said first polarity and a different predetermined signal when disabled, first polarity gating means connected to conduct only signals of said first polarity output from said signal responsive means to enable said first circuit; a second circuit operative as enabled by a signal of only said second polarity to provide a given signal output when enabled and a different output when disabled, second polarity gating means connected to conduct only signals of said second polarity from said signal responsive means to enable said second circuit, and a first gate means only enabled in response to the simultaneous outputs which are provided by said first and second circuits in response to receipt of said first signal set over said input means, and a second gate means enabled only in response to the simultaneous outputs which are provided by said first and second circuits in response to receipt of said second signal set over said input means.

8. An electronic tone detector as set forth in claim 7 in which said signal responsive means includes input limiting amplifier means connected between said input means and said frequency discriminator means.

9. An electronic tone detector as set forth in claim 7 in which said frequency discriminator means comprises a first and second tuned circuit and diodes connected to the output thereof, the diodes of said first tuned circuit being connected to provide a signal output of said first polarity in response to receipt of signals of said first frequency tone, and said diodes of said second tuned circuit being connected to provide a signal output of said second polarity in response to receipt of said second frequency tone.

10. An electronic tone detector as set forth in claim 7 in which said signals of said first frequency tones are interrupted at a predetermined frequency, and in which said first circuit includes a filter tuned to said predetermined frequency, and threshold means connected to the output of said filter for providing said one signal output responsive to application of a signal of said first polarity to said filter by said first polarity gating means.

11. An electronic tone detector as set forth in claim 6 in which said signals of one set received over said input means are comprised of tone signals of a first frequency and a second frequency which are frequency shifted at a given frequency, and in which said enabling means includes an output connection extending from said threshold detector to said first and second signal gates, and an output connection extending from said level detector means directly to said first signal gate and through an inverter to said second signal gate.

12. An electronic tone detector circuit as set forth in claim 7 in which a third set of signals comprised of signals of said second frequency tone interrupted at a second predetermined frequency are received over said input means, and which in- 10104064 0059 cludes a third circuit including a filter circuit tuned to said second predetermined frequency, a third polarity gating means connected to pass signals of said second polarity output from said signal responsive means to said filter in said third circuit, and means connected to the output of said third circuit for providing a signal to succeeding circuitry as busy marking means.

13. In an electronic tone detector circuit for an automatic telephone system, input means over which a first signal set comprised of first and second simultaneous tone signals is provided to represent one condition, and a second set of signals comprised of one of said first and second tones is provided alone to represent a second condition, signal responsive means including frequency discriminator means for providing a signal of a first polarity responsive to each receipt of said first tone signal, and a signal of a second polarity responsive to each receipt of said second tone signal, a first and a second polarity gating means connected to a common output of said signal responsive means, each of which is operative to conduct a different one of said signals of said first and second polarity, a first circuit connected to be enabled by the signal output of said first polarity gating means, and a second circuit connected to be enabled by the signal output of said second polarity gating means, a first and a second signal gate, and means for connecting the output of said first and second circuits to said first and second signal gates to enable said first signal gate only in response to receipt of said first signal set over said signal means, and to enable said second signal gate only in response to receipt of said second signal set over said input means.

* * * * *